UNITED STATES PATENT OFFICE.

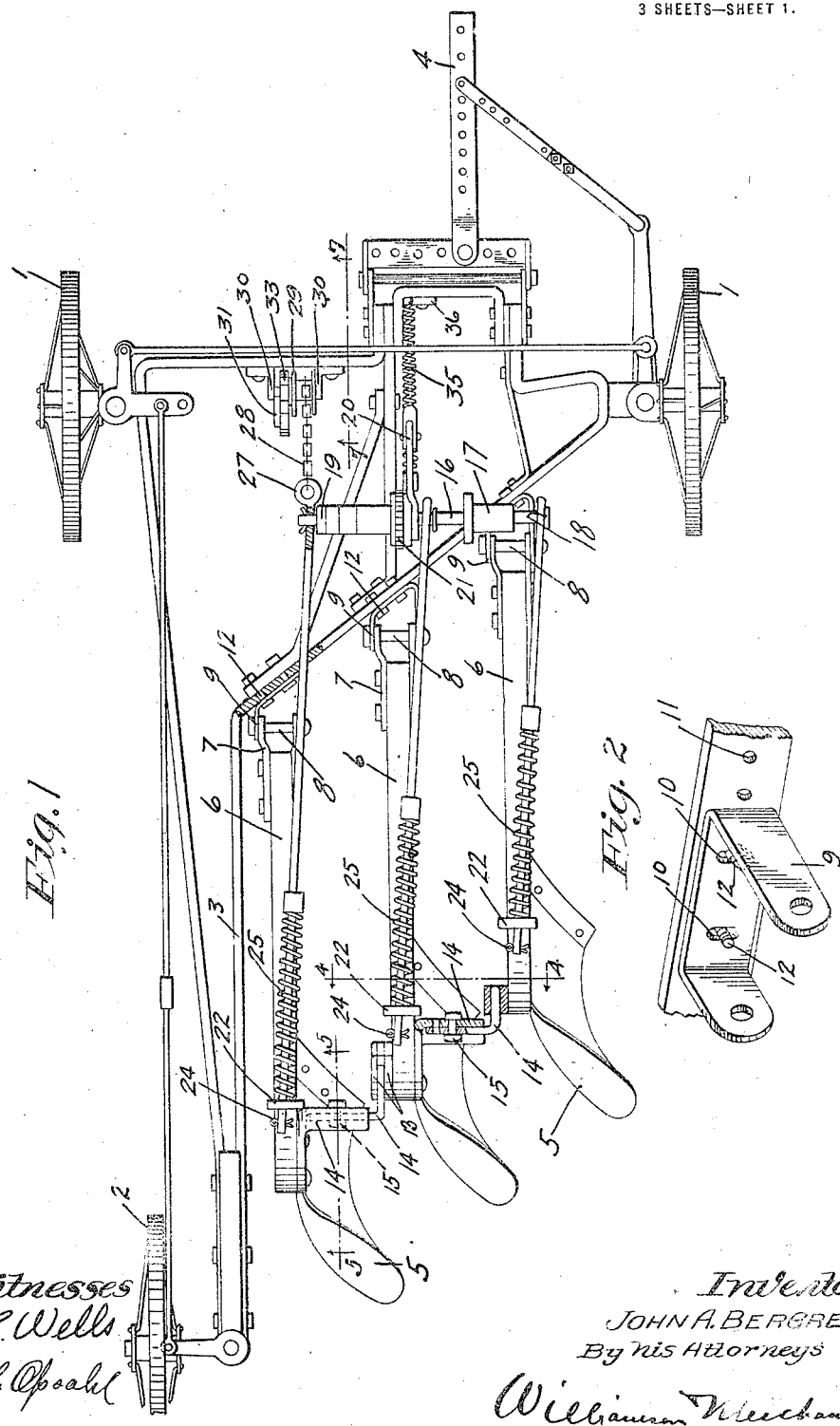

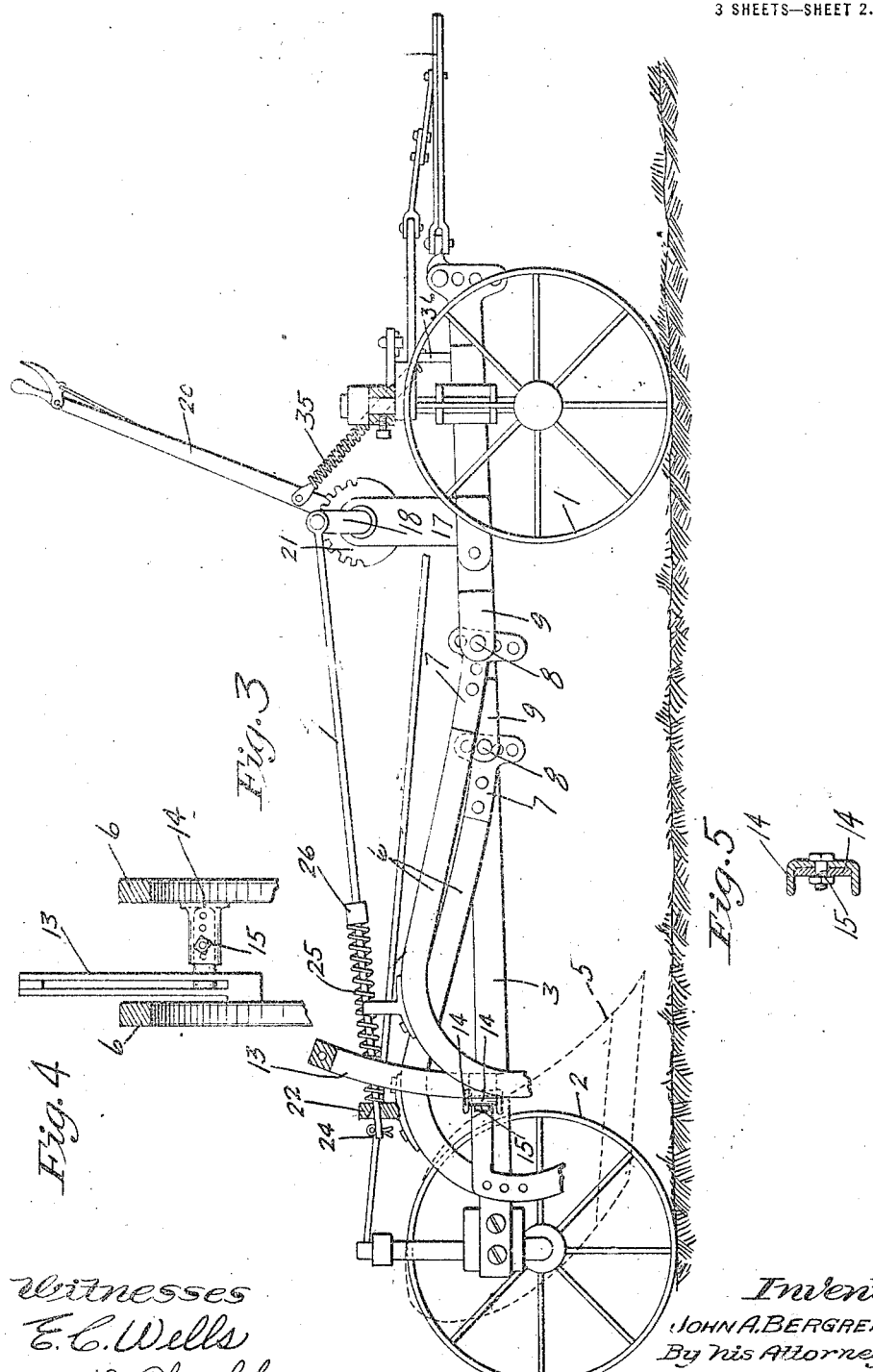

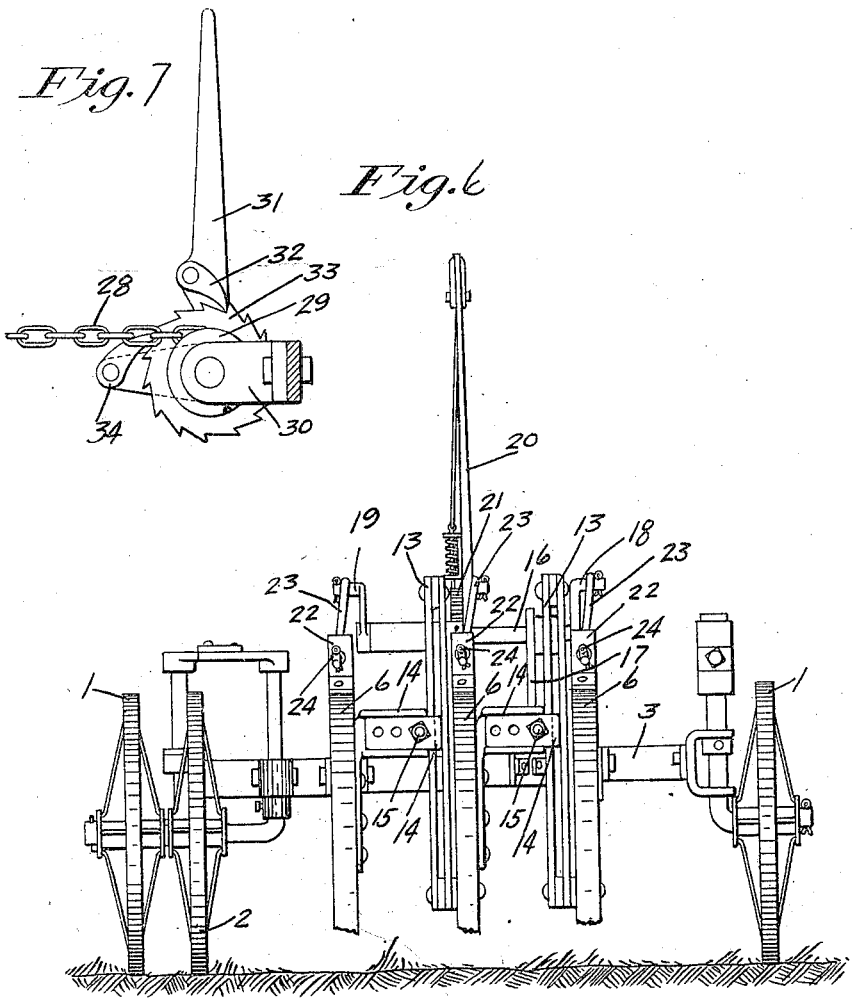

JOHN A. BERGREN, OF LAKE PARK, MINNESOTA, ASSIGNOR OF ONE-TWENTIETH TO AUGUST HOLMGREN, THREE-TWENTIETHS TO JOHN H. MOAN, THREE-TWENTIETHS TO CHARLES H. KELSON, ONE-TWENTIETH TO CARL T. STRAND, AND TWO-TWENTIETHS TO ALFRED F. YOUNGBERG, ALL OF LAKE PARK, MINNESOTA.

PLOW-LIFTING DEVICE FOR GANG-PLOWS.

1,296,039.  Specification of Letters Patent.  Patented Mar. 4, 1919.

Original application filed June 28, 1915, Serial No. 36,697. Divided and this application filed December 15, 1916. Serial No. 137,234.

*To all whom it may concern:*

Be it known that I, JOHN A. BERGREN, a citizen of the United States, residing at Lake Park, in the county of Becker and State of Minnesota, have invented certain new and useful Improvements in Plow-Lifting Devices for Gang-Plows; and I do hereby declare the following to be a full, clear, and exact description of the invention, such as will enable others skilled in the art to which it appertains to make and use the same.

My invention relates to improvements in plow lifting devices for gang plows and is filed as a division of my co-pending application, entitled "Gang plows", filed June 28, 1915, under Serial Number 36,697, and allowed July 3, 1916.

To the above end, the invention consists of the novel devices and combinations of devices hereinafter described and defined in the claims.

In the accompanying drawings, which illustrate the invention, like characters indicate like parts throughout the several views.

Referring to the drawings,

Figure 1 is a plan view of a gang plow having the invention incorporated therein;

Fig. 2 is a detail perspective view, showing one of the plow beam coupling yokes and a portion of the plow frame;

Fig. 3 is a fragmentary side elevation with some parts sectioned and with one of the plows shown in a raised position by means of broken lines;

Fig. 4 is a detail view in section taken approximately on the line 4—4 of Fig. 1;

Fig. 5 is a detail view in section taken on the line 5—5 of Fig. 1, on an enlarged scale;

Fig. 6 is a rear elevation; and

Fig. 7 is a detail view with the plow frame sectioned on the line 7—7 of Fig. 1, on an enlarged scale.

For the purpose of this divisional application, it will not be necessary to describe in detail the truck of the gang plow and it is only necessary to note the two front wheels 1, rear wheel 2, frame 3, which, as shown, is an approximately triangular skeleton structure, and draw bar 4.

The plows 5 have the usual beams 6, to the front ends of which clevis plates 7 are rigidly secured. These clevis plates 7 have vertically spaced perforations, through which coupling bolts 8 are passed to couple the same to the perforated prongs of clevis yokes or brackets 9. Said yokes 9 are adjustably connected to the oblique member of the frame 3, preferably with freedom for both vertical and lateral adjustments. To this end, the yokes 9 are provided with vertically spaced slots 10 and the oblique member of the frame 3 is provided with transversely spaced perforations 11, through which and the slots 10, nut-equipped bolts 12 are passed.

Upright guide bars 13 are rigidly secured to the rear portions of the plow beams 6 of the inner and intermediate plows and guide arms 14 are rigidly secured to the rear portions of the intermediate and land side or outer plow. These guide bars 13 and arms 14 are provided for positively spacing the plows, but permitting independent vertical movements thereof. The guide arms 14 are preferably made Z-shaped and are each made up of two sections having overlapping perforated portions adjustably and rigidly connected by nut-equipped bolts 15. The outer end portions of the guide arms 14 are rigidly secured to the plow beams of the intermediate and outside plows, while the forwardly extended inner ends of said guide arms work with freedom for vertical movement between the guide bars 13 of the intermediate and inside plow beams 6.

As a means for raising and lowering the plows 5, I provide a transverse rock shaft 16 mounted in upright bearings 17 rigidly secured to the frame 3. This rock shaft 16, at its ends, has upwardly extended bearing arms 18 and 19; and, at its intermediate portion, it is provided with an upwardly extended latch lever 20, which coöperates with a latch arch 21 rigidly secured to one of the upright bearings 17.

The rear portion of each plow beam 6 is provided with an upwardly projecting arm or lug 22, having a perforation through which the rear end of a lifting rod 23 is passed. Cotters or other forms of stop devices 24 are applied in the extreme rear ends of the lifting rods 23 and engage the lugs 22 to cause said rods to raise the plows when pulled forward. The front ends of the lifting rods 23 are connected, one to the arm 18, another to the arm 19 and the third or intermediate to the lever 20, at a point in line with the pivotal connections between the outside rods 23 and the arms 18 and 19. The lever 20 is, therefore, made to serve as one of the crank arms for connecting the intermediate lifting rod 23 to the rock shaft 16.

Coiled springs 25 are placed around the rear portions of the lifting rods 23 and are compressed between the respective lugs 22 and stop collars 26 on said rod. These springs yieldingly press the plows downward, but permit them to independently rise, in case they strike a rock or other obstruction.

The land side lifting rod 23 is detachably connected to its crank arm 19 and is provided with a forwardly projecting eye 27 to which one end of a chain 28 is secured. The other end of this chain 28 is attached to and adapted to be wound upon a windlass drum 29, the shaft of which is journaled in bearing lugs 30 rigidly secured to the inner face of the transverse front bar of the frame 3. The windlass drum 29 is rotated by a hand lever 31 connected thereto by a pawl 32 and a ratchet wheel 33. This lever 31 is fulcrumed on the shaft of the windlass drum 29 and carried on the pawl 32, and the ratchet wheel 33 is rigidly secured to the windlass drum 29. A gravity actuated pawl 34 is pivoted to one of the bearing lugs 30 and arranged for coöperation with the ratchet wheel 33, to prevent backward rotation of the windlass drum 29, and hence, the unwinding of the chain 28, under the weight of the land side plow 5.

To make the lifting of the plows an easy matter, under manipulation of the lever 20, they are, in part, counterbalanced or lifted by a heavy coiled spring 35. This spring 35, as shown, is anchored, at one end, to the lever 20 and, at its other end, to a projection 36 on the front bar of the frame 3.

As is evident, by manipulating the lever 20, the plows may be lowered and raised to and from operative positions and may be raised or set into inoperative positions above the ground. When set in operative positions in the ground, the plows 5 are yieldingly pressed downward by the coiled springs 25, so that they may rise to clear rocks or other obstructions. The depth at which the plows will enter the ground depends upon the elevation of the front ends of the plow beams 6.

It is sometimes desirable to use plows of different widths; for instance, breaking plows are usually narrower than other plows. For this reason, means, above described, have been provided for varying the spacing of the plows. Obviously, when the spacing of the front ／rls of the plow beams 6 is varied by adjustments of the clevis brackets 9 on the oblique bar of the frame 3, the spacing of the plows 5 should be correspondingly varied by adjustments of the two-part spacing arms 14.

A small tractor, such as will preferably be used in connection with this gang plow, will be found to have sufficient power to draw three plows, under certain conditions of the soil, but may not be powerful enough to draw more than two plows, under certain other conditions of the soil. For this reason, it is advisable to provide a simple and efficient means for holding one of the plows out of action, when desired. The above described lever actuated windlass drum 29 on the frame 3, with its chain connection 28 to the eye 27 on the respective lifting rod 23, affords very simple means for accomplishing this result.

Obviously, by detaching the land side lifting rod 23 from the crank arm 19 and operating the lever 31 with a ratchet-like action, the land side plow may be raised and held in its inoperative position, while the other two plows may be manipulated, just as if all of the plows were operative. It is also evident that the said plow may be lowered by reversing the action of the lever 31. Here, it will be noted that the vertical space between the spacing bars 13 of the intermediate plow is extended in a vertical direction, far enough to permit the above noted independent movements of the plows.

When two plows, instead of three, are employed, the draw bar 4 should be adjusted laterally, so as to properly set the line of draft. Also, different spacing of the plows may require lateral adjustments of said draw bar, in order to maintain the proper line of draft.

It will, of course, be understood that the novel features, above described, may be applied to a gang plow having more or less than three plows and that said features are important, regardless of whether the plow is to be drawn by a tractor or draft animals.

What I claim is:—

1. In a gang plow, a plurality of plows, a common plow lifting device having independent connections to the several plows, at least one of the said plow lifting connections being detachable from the said plow lifting device, and a plow supporting device operative on said detachable plow lifting connection before it is detached, but while the plows are raised, and, when operative, serving to hold the detached plow lifting connection in position to support its coöperating plow in a raised inoperative position.

2. In a gang plow, the combination with a frame, of a plurality of plows having beams pivotally attached to said frame, lever actuated plow lifting devices comprising a rock shaft having radial projections and lifting rods independently connecting the projections thereof to the rear portions of the several plow beams, the lifting rod of the land side plow beam being detachable from said rock shaft, and a plow lifting and supporting device, engageable with the lifting rod of the land side plow, to hold the land side plow in a raised inoperative position.

3. In a gang plow, the combination with a frame, of a plurality of plows having beams pivotally attached to the said frame, lever actuated plow lifting devices comprising a rock shaft having radial projections and lifting rods independently connecting the projections thereof to the rear portions of the several plow beams, the lifting rod of the land side plow beam being detachable from said rock shaft, and a plow lifting and supporting device engageable with the lifting rod of the land side plow, for holding said plow while the said rod is detached from said shaft, and serving, after the said rod is detached from said rock shaft, for raising the land side plow and holding the same in a raised inoperative position.

In testimony whereof I affix my signature in presence of two witnesses.

JOHN A. BERGREN.

Witnesses:
 H. M. Dahl,
 C. E. Davis.